United States Patent Office 3,671,185
Patented June 20, 1972

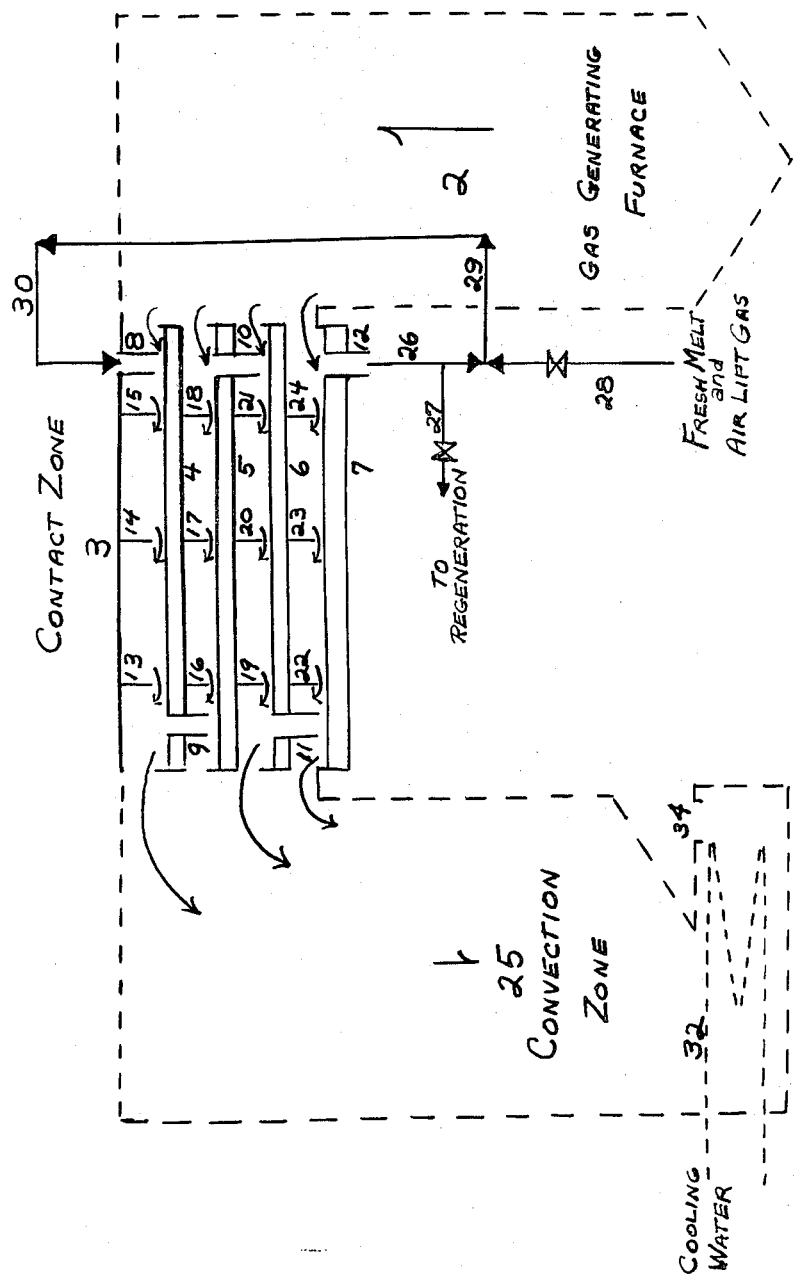

3,671,185
PURIFICATION OF WASTE GASES
Philip A. Lefrancois, Cranford, and Kenneth M. Barclay, Stockton, N.J., assignors to Pullman Incorporated, Chicago, Ill.
Filed Aug. 12, 1968, Ser. No. 751,933
Int. Cl. B01d 53/34
U.S. Cl. 23—2 R          17 Claims

ABSTRACT OF THE DISCLOSURE

Compounds of sulfur and of nitrogen and fly ash are removed from gases by absorption at between 1500° F. and 2000° F. under atmospheric to 5 atmospheres pressure in a molten carbonate salt of sodium, potassium and/or lithium, and the decontaminated combustion gas stream is cooled and vented to the atmosphere.

---

This invention relates to the process for purification of gas streams. In one aspects, this invention relates to a process for removal of pollutant gases and solids from gas streams which are vented to the atmosphere. In a more specific aspect, this invention relates to a process for treatment of gases to eliminate objectionable contaminants such as compounds of sulfur and of nitrogen and fly ash from power plant combustion gases.

It has been customary to vent industrial waste gases to the atmosphere from a chimney. These waste gases include combustion of oxidizable materials, and may additionally include by-product gases, such as those evolved in the commercial production of desired synthesis products and suspended particles.

When the waste gases containing compounds of such as hydrogen sulfide, oxides of sulfur and of nitrogen, carbon monoxide and fly ash, are vented to atmosphere, the amount of these components can reach such levels of concentration that they act as irritants which permeate the atmosphere and which cause numerous respiratory ailments.

Existing methods for control of pollutants from such gases, e.g., dolomite addition, or the use of chimneys or the selective use of low sulfur fuels have been found inadequate because of their inefficiency, their ability to control only a portion of the undesirable constituents, and their lack of a practical and economic approach to the problem.

There has now been discovered a method for substantially complete removal of such contaminants from gases which avoids the difficulties mentioned above and which is effective in removing a wide variety of gases as well as solids.

Accordingly, it is an object of this invention to provide an improved method for removal of contaminants from gases.

It is another object of this invention to provide an improved method for reducing the irritant concentration of industrial gases emitted to the atmosphere.

It is another object of this invention to provide a continuous and regenerative process for purification of industrial off-gases which provides for the recovery of components removed from the gases and which permits the use of a feedstock high in sulfur in the reactor which feedstock would otherwise be unsuitable because of its high degree of contamination.

It is a further object of this invention to provide a method of purifying industrial gases which is operative at the conditions under which the gases are produced.

It is still a further object of this invention to provide a commercially feasible and economical single stage process for removal of a wide range of contaminants, both gaseous and solid, from vented gaseous material.

These and other objects of the invention will become apparent from the following description and disclosure.

According to the process of this invention, a metal carbonate melt of sodium, potassium, or lithium or mixtures thereof and a contaminated industrial sulfur-containing gas are contacted under conditions such that a pressure of from about atmospheric to about 5 atmospheres is maintained with a pressure drop of less than two pounds per square inch, preferably not more than one pound per square inch, during contact and a critical temperature within the range of from 1500° F. to 2000° F. is maintained in the contacting zone so that contaminants of the gas are absorbed by the melt and the formation of a metal sulfite is substantially avoided. A preferred method of contacting the gas and melt is to direct the gas by means of a baffle or the like to impinge on the surface of a moving film of the melt disposed on a tray in a contacting zone. More preferably a plurality of baffles are employed over each tray to provide multi-point impingement of the gas on the surface of the melt and a series of trays with downcomers employed to successively pass the melt onto each tray in series and finally into the liquid outlet of the contacting zone from which a portion of the liquid melt can be withdrawn for purification and/or recovery of contaminating elements and the remaining portion can be subjected to heating, e.g., by oxidation of any contained or introduced carbonaceous material to maintain the molten state prior to recycle of the melt to the absorption zone. Alternatively the remaining portion can be directly recycled to the first tray of the series for further contact with gas in a continuous operation wherein indirect heating is provided.

The contaminants concerned herein are those constituents, whether liquid, gaseous or solid, whose presence is objectionable when emitted to the atmosphere. Among these are sulfur dioxide, hydrogen sulfide, sulfur trioxide, the oxides of nitrogen and carbon, fly ash, soot, and combinations thereof as contained in industrial off-gases. The materials may be contained in any vented gas such as carbon dioxide, nitrogen, oxygen, air, water vapor or combinations thereof as found in off-gases from power plants, petroleum refining, chemical plants, pulp and paper, soap, detergent, and textile manufacturers, automobile and steel plants and leather processing plants.

The carbonate melts of the present invention have low volatility under the conditions employed and the pressure drop during contact is not permitted to exceed 1.5 pounds per square inch, for example a pressure drop of about 0.15 pound is suitable, so that loss of salt with absorbed contaminant in the gas stream contacted is avoided. Suitable melts are sodium, potassium, and lithium, carbonates which may or may not contain the corresponding metal hydroxides, and oxides. Typical examples of suitable combinations of such compounds are admixtures of sodium carbonate and sodium hydroxide, potassium carbonate and sodium hydroxide as well as ternary systems of such salts.

The removal of gaseous and solid contaminants from a volume of gaseous material by the melt is effected by absorption, adsorption, occlusion or chemical combination. The contacting of melt and gas can be effected in any convenient manner which would not result in a pressure drop of more than 1.5 pounds per square inch. When this limit is exceeded, the cost of the process is greatly increased since high powered blowers of more sophisticated design are required to circulate gas through the viscous melt and the danger of melt entrainment in the vented gas is not eliminated. Certain components of the gas are corrosive which leads to frequent shut-down and replacement of expensive pumping devices. Therefore, a pressure drop in excess of 1.5 pounds per square inch is to be avoided. Efficient contacting with a proper pressure drop most preferably between about 0.01 and about 1 pound per square inch can be effected, however, by flowing the gas stream in counter-current as well as concurrent contact with a moving stream of molten salt or simply discharging the gas stream onto the surface of a stationary bath of molten salt by directing means such as baffles or the like. The present process is particularly useful when a pressure drop in the higher portion of the above range is maintained. Since the treatment of corrosive or errosive commercial gas described herein is so efficient that contaminants can be removed to the extent of not more than a few parts per million, the exit gas is not harmful to metal equipment. Therefore, in the present process, rather expensive exhaust fans can be employed to remove exit gas at a high rate and aid in the circulation of gas from the zone where it is generated through the contacting zone and convection zone which may or may not contain a solids removal device. This exhaust equipment is not subjected to deterioration by the corrosive components which are present in the gas entering the contacting zone, and therefore, need not be replaced as frequently as blowers used for circulating feed gas.

The contacting of contaminated gas with the molten carbonate for the purpose of extracting the contaminants by the melt is carried out at a minimum temperature of 1500° F. This minimum temperature is a critical factor in avoiding the formation of metal sulfites in the melt from the sulfur contaminants of the gaseous mixture. Although the upper temperature at which the contacting zone is maintained is not critical, and temperatures of up to about 2000° F. and higher can be employed, the preferred temperature range which is maintained in the contacting zone is between about 1700° F. and about 1900° F. The pressure of the contacting zone is desirably maintained at about atmospheric, although pressures as high as 5 to 7 atmospheres can be employed. When an oxidation reaction is carried out in a separate zone to supply heat to the carbonate so as to maintain the molten state, pressures as high as 10 to 15 atmospheres may be employed in the contacting zone in order to avoid depressurizing the heated carbonate melt. In cases where depressurization of the heated carbonate melt is not of economic concern, the oxidation reaction can be carried out at pressures as high as 135 atmospheres pressure.

The heat required to maintain the salt in the molten state may be supplied in any suitable manner and from any suitable source. For example, heat may be supplied to the process by circulating a portion of the melt through a heat exchanger or furnace in which the temperature of the melt is increased. Another method of supplying heat to the process involves introducing the gas at a temperature higher than the temperature of the molten melt, sufficient heat being transferred from the gas to the melt to maintain the melt in the molten state. Such a method might be employed, for example, in a power plant, in which the hot gases from the boilers are contacted with molten salt, sufficient heat being transferred from the gas to the salt to maintain the salt in the molten state.

In still another method of supplying heat to the process, a separate reaction or oxidation zone is established through which melt, containing oxidizable carbonaceous material such as coal, charcoal or hydrocarbons, is circulated and into which an oxygen-containing gas such as oxygen, air or ozone is introduced. The exothermic oxidation of the carbonaceous material in the melt imparts sufficient heat directly to the molten salt to maintain the oxidation zone at a temperature of about 30° to about 250° higher than the temperature of the contacting zone, but as little as 10° difference in temperature between the zones is sufficient when high circulation rates are employed. The oxidation reaciton is generally carried out at the pressure of the contacting zone.

Various additives may be introduced into the oxidation zone. These include alkali and alkaline earth metal sulfates, coal ash and the like which serve to enhance the rate of combustion. Any sulfur which is absorbed in the melt from the contaminated gas in the form of sulfide, is converted to the corresponding sulfate at the higher combustion temperature to which a portion of the melt may be subjected. However, the sulfate containing melt can be recycled to the contacting zone without detrimental affect on the further absorption of sulfur contaminants of the gaseous material if the concentration is maintained below 75 weight percent.

The carbonaceous material oxidized in the oxidation zone is preferably converted to carbon dioxide rather than carbon monoxide in order to provide a more advantageous heat release and thereby minimize the circulation rate of the molten material. The amount of oxidant introduced to the combustion zone should be sufficient to supply the desired heat by means of the oxidizing reactions but large excesses should be avoided from the standpoint of economics. In the absorption step, the sulfur of sulfur contaminants such as hydrogen sulfide forms a sulfide of the alkali earth metal of the melt and this sulfide is converted to the sulfate in the presence of excess oxidant.

The preferred method of contacting contaminated commercial gases with the carbonate melt comprises impinging the gas on the surface of the melt which is contained on one or more trays employed in series. During contact, agitation of the melt should be avoided so as to eliminate entrainment of melt in the vented gases and obviate the need for demister apparatus which would necessarily be composed of costly abrasion- and corrosion-resistant materials. The trays or trays containing the melt should be composed of a highly corrosion-resistant material such as alumina or zirconia having a dense microstructure, most preferably Monofrax A, a dense alumina, having the following specifications:

Thermal conductivity (2000° F. mean temperature): 49 B.t.u./ft.$^2$/in./° F./hr.
Percent linear expansion (2000° F. mean temperature): 0.88.
Electrical resistivity (ohm-cm. at 2550° F.): 715.
Density in pounds/cu. ft: 220.
Knoop Hardness K-100: 2205.
Transverse strength: 3855 p.s.i.

The material of construction in all zones containing the melt should be composed of the above-described or similar high corrosion-resistant materials.

Generally, the present process comprises passing commercially produced off-gases into the contacting zone for removal of contaminants by the carbonate melt, passing the decontaminated gas into a convection zone where the gas is cooled and from which the gas is subsequently vented to the atmosphere. The carbonate melt is continuously withdrawn and recycled to the contacting zone with a portion being removed for regeneration and a like portion of fresh carbonate feed being added to the recycle stream to supplement the amount of carbonate passed to regeneration. The preferred regeneration procedure is described in co-pending patent application S.N., 751,934, filed Aug. 12, 1968, now U.S. Pat. 3,567,377, although any other convenient method for regeneration of the carbonate melt can be employed. Generally, the process of the above-mentioned co-pending application comprises diluting the melt with an aqueous solution of the corresponding metal bicarbonate and, if necessary, filtering solids from the resulting solution; passing the resulting solution to a two-stage carbonation zone wherein the first stage effects conversion of the metal carbonate to bicarbonate precipitate with carbon dioxide to provide a more viscous, less alkaline solution; passing this solution to the second stage wherein it is separately contacted with carbon dioxide for removal of sulfur values as hydrogen sulfide; and finally converting at least a portion of the metal bicarbonate to the corresponding metal carbonate and concentrating and heating the resulting carbonate to provide a suitable recycle of carbonate melt to the process described herein.

The present process is more particularly illustrated by the accompanying drawing; however, the arrangement shown in the drawing is provided solely for the purpose of illustration and is not to be regarded as limiting to the scope of the invention described herein. It is also to be understood that the contacting zone shown in the drawing can be mounted in a chimney type of arrangement wherein the convection zone can be located above the contacting zone with water cooling means provided to cool the gases before they are vented into the atmosphere from the top of the chimney, if desired.

According to the drawing, 87 million standard cubic feet per hour of carbon dioxide flue gas is generated in the lower portion of gas generating furnace zone supplied by an 800 megawatt power plant which burns 280 tons per hour of coal with 20 percent excess air. The furnace is operated at a temperature of about 2700° F. under essentially atmospheric pressure. The contaminated gases which are formed the reaction of coal with air, contain contaminating constituents such as 0.25 weight percent of sulfur dioxide, 0.01 weight percent of sulfur trioxide, about 0.04 weight percent of nitrogen oxides and carbon monoxide, and about 80 weight percent of the ash in the coal as fly ash. The gases containing the contaminants are passed upwardly in zone 2 and passed to contacting zone 3.

Contacting zone 3 is comprised of four shallow trays adapted for holding the carbonate melt at a depth of from about $\frac{1}{16}$ inch to 6 inches. The trays are also equipped with downcomers 8 through 12 adapted to pass the melt from the top tray to the bottom tray in series. Thus, the carbonate melt entering downcomer 8 passes liquid melt to tray 4 which after reaching a desired level, e.g., 1.5 inches, is passed to tray 5 by means of downcomer 9, then to tray 6 by downcomer 10, to tray 7 by downcomer 11 and finally to outlet downcomer 12. The liquid enters the downcomer by overflowing the tray depth which can be set at different levels for various operations. Usually a deeper tray depth is employed when low liquid circulation rates are used, as with a gas having substantially low contamination. Over each tray, one or more baffles are employed to direct the passage of gas into the surface of the liquid melt and thus establish contact of liquid and gas by impingement. In the drawing three baffles over each tray are employed as shown by baffle blades 13 through 24. In the process of the drawing, the melt of each of the trays is maintained at a depth of 1.5 inches and is withdrawn by means of outlet downcomer 12 and line 26 at a rate of 360,000 pounds per hour. Of the withdrawn carbonate melt, 240,000 pounds per hour are separated in valved line 27 and passed to regeneration, preferably under conditions described in co-pending application S.N. 751,934 filed Aug. 12, 1968. The remaining carbonate melt is passed into recycle line 29 wherein it is mixed with 240,000 pounds per hour of fresh melt from aerated valved line 28. The combined carbonate melt in the present example is maintained at a temperature of 1800° F. by introducing the fresh feed carbonate at a temperature of 400° F. introducing 9200 pounds of carbon per hour and subjecting the mixture to combustion. The heated carbonate melt is then passed into feed downcomer 8 for contact with contaminated gases.

The contaminated gases entering zone 3 are forced to impinge on the moving surface of the melt at at least three separate points regulated by positioning the baffles. As the gas passes over the melt in the trays it is decontaminated and passed from zone 3 into convection zone 25. The gases pass downwardly while undergoing cooling in the convection zone and are finally cooled to an appropriate temperature by indirect heat exchange with water cooling coil 32, located in the lower portion of zone 25 prior to the vent port 34. Fly ash separators of the bag or electrical precipitator types can also be employed prior to or after port 34 for removal of any solid in the flue gas which is not removed by the melt. To enhance the economics of the process, the flue gas is heat exchanged with incoming air employed in combustion. The gases from port 34, 87,300,000 standard cubic feet per hour of flue gas containing less than 50 parts per million of sulfur dioxide, less than 1 part per million of sulfur trioxide, less than 10 parts per million of nitrogen oxides, and substantially no carbon monoxide are vented to the atmosphere from a chimney (not shown).

Many alternations and variations of the above-described method of the drawing will be apparent to those skilled in the art from the foregoing description and disclosure. For example, the cooling coil in convection zone 25 can be carried through the entire length of the zone to provide gradual and positive cooling of the gases immediately after contact, cooling can also be accomplished by elongating the convection zone as in a long pipe arrangement. When the convection zone is located above the contact zone the vent port is located at the top of the convection zone. Also in a chimney type of arrangement a falling film of melt can be brought into direct contact with rising gases by means of a labyrinth of baffles arranged along the length of the chimney and by providing a lower liquid reservoir for recovering the melt for recycle to the top of the contact zone by means of a pumping device. In the above example, the entire 240,000 pounds per hour of melt withdrawn in line 26 need not be treated for regenration when a substantial portion of this melt (e.g., from about 100,000 to about 150,000 pounds per hour) is settled to remove solids before recycle. The contacting zone is generally located in close proximity to the gas generating source in order to utilize the heat contained in the gaseous material generated. It is to be understood that, in the above illustration, any of the other contaminated gases referred to herein can be substituted for the flue gas generated in the furnace of the present illustrations and that any of the other carbonate melts or melt mixtures can be substituted for the sodium carbonate melt in this example.

The following examples are set forth to further illustrate certain embodiments of the invention but are not to be construed as limiting the scope thereof.

EXAMPLE 1

A sodium carbonate melt containing 4 percent anthracite coal is maintained at 1740° F. in a contacting zone. A gas mixture of 1 percent sulfur dioxide in nitrogen at 1700° F. is counter-currently contacted by impingement with the melt in a column at 0.5 foot per second superficial gas velocity and a pressure drop of less than 0.05 p.s.i. The exit gas from the melt is passed through a cooling zone to lower the temperature to about 75° F. whereupon it is analyzed. The exit gas contains less than 5 parts per million (p.p.m.) sulfur dioxide.

EXAMPLE 2

A gas mixture of 1 percent hydrogen sulfide in nitrogen is bubbled through molten melt of the same composition and at the same temperature as in Example 1 at a rate of 0.5 foot per second and at a pressure drop of 1.5 p.s.i. An auixilary gas blower is employed to transport the gas, and the exit gas is passed through a demister zone to remove entrained carbonate droplets. The additional pressure drop through the demister (about 5 p.s.i.) is taken into account in designing the size of the blower. After 0.5 hour the demister filter composed of stainless steel requires replacement due to heavy corrosion. The exit nitrogen from the demister zone is initially found to contain less than 5 p.p.m. of carbonate and hydrogen sulfide but after failure of the demister apparatus, the entrainment of carbonate containing absorbed hydrogen sulfide causes an increase of 20 percent in the concentration of hydrogen sulfide contaminant.

EXAMPLE 3

A gas mixture of 1 percent sulfur dioxide in nitrogen at 1750° F. is bubbled through a molten sodium carbonate melt at a velocity of 0.6 and 1.0 foot per second. In both instances, the sodium carbonate was held at 1740° F. and contained 8 percent coal ash, 2.5 percent sodium sulfide and 2 percent anthracite coal. Under both feed rate conditions, the sulfur dioxide content of the effluent nitrogen was reduced to less than 5 p.p.m. however, filtering equipment was needed which required frequent replacement in order to maintain this low level of contamination.

EXAMPLE 4

Under the conditions described in Example 3, 1 percent sulfur dioxide in nitrogen is caused to impinge upon a quiescent surface of molten sodium carbonate contained on a Monofrax A alumina tray. Removal of the sulfur dioxide from the nitrogen to less than 5 p.p.m. is effected and no filtration of the vaporous effluent from the contacting zone is required. A simple exhaust fan to evacuate the decontaminated gas can be used to effect gas circulation at a rate of up to about one foot per second over the surface of the melt.

EXAMPLE 5

About 0.5 foot per second of a gas mixture of 1 percent nitric oxide in helium is impinged upon the quiescent surface of molten sodium carbonate at 1740° F. The nitric oxide content of the helium gaseous effluent is reduced to less than 100 p.p.m. in the absence of filtration.

EXAMPLE 6

In a commercial operation as described by the embodiment of the drawing, about 300 pounds per hour of a gas from a commercial process plant, furnace 2, containing 2500 p.p.m. sulfur dioxide, 100 p.p.m. sulfur trioxide, 200 p.p.m. nitrogen oxides, is passed into contacting zone 3 at 1800° F. under 1.2 atmospheres in contact with sodium carbonate melt maintained on several trays 4 to 7 as a continuously moving film which is passed in series from tray to tray and out of the contacting zone by means of stand pipes 8 to 12. Baffles 13 through 24 are disposed to direct the gas stream downwardly so as to impinge on the surface of the molten carbonate at a plurality of points over each tray. A liquid depth of about 1.5 inches of melt are maintained on each tray in the zone and the pressure drop of gas across the trays is about 0.05 pound per square inch.

The contacted gas leaves contacting zone 3 and passes into convection zone 25 where it is cooled to 600° F. and the gas is vented through exit port 34. The removal of sulfur dioxide from 0.25 percent to 10 p.p.m. and the removal of sulfur trioxide from 0.01 percent to 0 p.p.m. and the removal of nitrogen oxide from 200 p.p.m. to 1 p.p.m. is effected.

In the above examples, a subsequent zone for the regeneration of molten salt for reuse in the system can be employed to operate in conjunction with the contacting zone.

The recovery of the molten salt may be effected in a number of ways. For example, a portion or all of the salt may be withdrawn from the contacting zone, allowed to solidify, thereafter being regenerated and reintroduced into the system.

In another embodiment, a heat generating oxidation zone is employed to maintain the carbonate at the melt temperature. The oxidation zone can be used in combination with the contacting zone and the regeneration zone.

Sodium carbonate is melted, brought to about 1740° F. and is introduced into the upper section of an absorption tower for downward passage therethrough. Hot gas, from the combustion of fuel oil or coal containing carbon dioxide, nitrogen, oxygen water vapor, hydrogen sulfide, and sulfur dioxide is introduced into the lower section of the tower and flows upward in countercurrent contact with the descending molten carbonate melt by means of baffles. Melt rate of feed to the tower is adjusted so that excess of tolerable levels of contaminants are removed from the gas in the top of the tower. Gases are preferably introduced into the tower at a temperature above the melting point of the absorbent molten salt.

Molten sodium carbonate containing suspended soot, and absorbed hydrogen sulfide and sulfur dioxide is removed from the bottom of the absorption tower and routed to the oxidation system. Into the molten melt to the oxidation zone is injected −10 mesh bituminous coal in a stream of air at a temperature of about 800° F. Air rates to the oxidation zone are regulated to maintain the temperature of the melt recirculated back to the absorption zone above 1800° F. and to maintain the carbon monoxide content of the gases evolved from the oxidation zone at no more than 3 percent. From the oxidation zone, a quantity of melt containing ash and coal is recycled back to the absorption tower.

From the circulation system prior to the oxidation reaction a quantity of molten salt is withdrawn. Sufficient heat is extracted to permit solidification. The solidified melt is then dissolved in water from which solution solids such as coal and ash are separated.

From the solution, sodium carbonate is recovered and passed with the melt circulated to the reheating zone, e.g., the oxidation zone. Solids such as coal and ash may be dried and returned to the oxidation zone.

Many variations and modifications within the scope of the process of this invention will become apparent from the above description and disclosure.

Having thus described our invention, we claim:

1. In a process for removing a contaminant of the group consisting of an oxide of sulfur, carbon monoxide, an oxide of nitrogen, carbon, hydrogen sulfide or mixtures thereof from a sulfur-containing combustion gas, the improvement which comprises: contacting said gas with a melt consisting essentially of a metal carbonate of sodium, potassium, lithium or mixtures thereof at a temperature which is maintained within the range of between 1500° F. and 2000° F. under a pressure drop of not more than 1.5 pounds per square inch to effect absorption of contaminant in the melt and to prevent the formation or accumulation of any substantial amount of sulfite in the melt, cooling the decontaminated gas and venting said gas to the atmosphere.

2. The process of claim 1 wherein the gas is contacted by impingement on the surface of the melt so as to effect absorption of the contaminant in the carbonate melt.

3. The process of claim 1 wherein the gas is contacted by impingement on the surface of the melt contained on a tray composed of dense alumina or zirconia which has high corrosion resistance so as to effect absorption of contaminant in the carbonate melt.

4. The process of claim 1 wherein the melt is contained on a plurality of stacked trays and wherein the melt is passed from one tray to the next in series by means of downcomers, a vapor space is provided between the trays and the gas in the vapor space is caused to impinge on the surface of the melt by means of a directional baffle directing the current of gas onto the surface of the melt.

5. The process of claim 4 wherein a plurality of baffles are employed in the vapor spaces over each tray to provide multipoint contact of the gas with the moving surface of the melt.

6. The process of claim 4 wherein the melt is withdrawn from the bottom tray of the contacting zone, a portion is withdrawn for regeneration, and a similar portion of fresh carbonate feed is added to the remaining melt and recycled to the first tray of the contact zone at the contact temperature.

7. The process of claim 6 wherein the portion of the melt withdrawn for regeneration is cooled to solidification, dissolved in water, filtered, dehydrated, and recycled to the first tray at the contact temperature.

8. The process of claim 6 wherein the recycled carbonate is heated by the temperature of the fresh carbonate feed to maintain the carbonate in the molten state and at a temperature of at least 1500° F.

9. The process of claim 6 wherein the recycled carbonate is heated by combustion of carbonaceous material in the melt with an oxidant such as oxygen or air so that sufficient heat is generated to maintain the carbonate in the molten state and at a temperature of at least 1500° F.

10. The process of claim 6 wherein the recycled carbonate is directly recycled to the first tray of the contacting zone and the temperature in the contactor is maintained at at least 1500° F. and above the melting temperature of the carbonate by the temperature of the incoming contaminated industrial gas fed to the contacting zone.

11. The process of claim 4 wherein hot gases generated in a furnace are passed over a plurality of horizontal trays containing a moving body of the carbonate melt and wherein the gases are contacted with the surface of the melt by means of a plurality of baffles arranged at a plurality of points in the vapor space between the trays, decontaminated gases are withdrawn from the contacting zone and passed to a convection zone for cooling to a temperature below 600° F. and the cooled decontaminated gas is vented from the convection zone.

12. The process of claim 1 wherein the gas is contacted with a concurrently moving film of the carbonate melt.

13. The process of claim 1 wherein gases are countercurrently contacted with the surface of the carbonate melt which is passed downwardly in a tower in a direction countercurrent to the rising gases.

14. The process of claim 13 wherein rising gases are caused to impinge on the surface of the melt which is caused to flow downwardly along the wall of a tubular contacting zone, said gas impingement being directed by a plurality of stacked baffles mounted along a portion of the wall adjacent to the downwardly flowing melt in the tubular reactor.

15. The process of claim 14 wherein the downwardly flowing melt is collected in a settling zone wherein solids in the melt are settled and separated and the resulting melt is then recycled to the top of the contacting zone.

16. The process of claim 14 wherein the decontaminated gases leaving the contacting zone are passed upwardly to a cooling zone and are then vented to the atmosphere.

17. The process of claim 1 wherein the gas is circulated through the contacting and cooling zones by suction caused by exhaust means at the outlet of the cooling zone.

References Cited

UNITED STATES PATENTS

| | | | |
|---|---|---|---|
| 1,032,536 | 7/1912 | Gerli et al. | 23—2 X |
| 2,496,550 | 2/1950 | Larsson et al. | 23—64 |
| 2,993,753 | 7/1961 | Collins | 23—48 |
| 3,438,722 | 4/1969 | Heredy et al. | 23—2 |
| 3,438,727 | 4/1969 | Heredy | 23—181 |
| 2,375,758 | 5/1945 | Bates | 23—104 X |
| 3,524,720 | 8/1970 | Bauer | 23—25 |

EARL C. THOMAS, Primary Examiner

U.S. Cl. X.R.

23—1 D, 102, 104, 159, 178 S, 181